US011880801B2

United States Patent
Garg et al.

(10) Patent No.: US 11,880,801 B2
(45) Date of Patent: Jan. 23, 2024

(54) DELIVERY SYSTEM UTILIZING A SECONDARY TRANSPORTATION SERVICE PROVIDER

(71) Applicant: International Business Machines Corporation, Armonk, NY (US)

(72) Inventors: Divyesh Garg, Pune (IN); Akash U. Dhoot, Pune (IN); Shailendra Moyal, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/539,544

(22) Filed: Dec. 1, 2021

(65) Prior Publication Data

US 2023/0169450 A1 Jun. 1, 2023

(51) Int. Cl.
*G06Q 10/08* (2023.01)
*G06Q 10/0835* (2023.01)
(Continued)

(52) U.S. Cl.
CPC ....... *G06Q 10/08355* (2013.01); *G06Q 10/02* (2013.01); *G06Q 10/06315* (2013.01);
(Continued)

(58) Field of Classification Search
CPC .............................................. G06Q 10/08355
See application file for complete search history.

(56) References Cited

U.S. PATENT DOCUMENTS 9,060,248 B1 *  6/2015  Coulombe ............ H04W 4/021
10,532,885 B1 *  1/2020  Brady .................. G06Q 10/083
(Continued)

FOREIGN PATENT DOCUMENTS

WO  WO-2012122448 A1 *  9/2012  ............. A01B 69/00

OTHER PUBLICATIONS

Natarajan, Shekar; How Autnomous Vehicles Will Disrupt Logisitics and Create New Business Opportunities; Jun. 4, 2019; Project Production Institute; Journal of Project Production Management, vol. 4. (Year: 2019).*
(Continued)

*Primary Examiner* — Daniel Vetter
*Assistant Examiner* — Christopher Gomez
(74) *Attorney, Agent, or Firm* — Michael A. Petrocelli

(57) ABSTRACT

A tool for dynamically booking, from an autonomous transportation vehicle, a secondary transportation vehicle. The tool identifies a route for the autonomous transportation vehicle transporting one or more products from a first location to a second location. The tool publishes the one or more products online as available for purchase. The tool identifies a customer order for the one or more products. The tool requests a secondary transportation vehicle to deliver the one or more products to fulfill the customer order. The tool instructs the secondary transportation vehicle to retrieve the one or more products to fulfill the customer order from the autonomous transportation vehicle. The tool instructs the secondary transportation vehicle to deliver the one or more products from the autonomous transportation vehicle to a delivery location to fulfill the customer order.

22 Claims, 3 Drawing Sheets

(51) Int. Cl.
  *G06Q 10/0832* (2023.01)
  *G06Q 10/0833* (2023.01)
  *H04W 4/021* (2018.01)
  *G06Q 10/0631* (2023.01)
  *G06Q 30/0251* (2023.01)
  *G06Q 10/02* (2012.01)
  *G06Q 10/087* (2023.01)

(52) U.S. Cl.
  CPC ....... *G06Q 10/087* (2013.01); *G06Q 10/0832* (2013.01); *G06Q 10/0833* (2013.01); *G06Q 30/0261* (2013.01); *H04W 4/021* (2013.01)

(56) References Cited

U.S. PATENT DOCUMENTS

| | | | |
|---|---|---|---|
| 2016/0063436 A1* | 3/2016 | Coles | G06Q 10/08345 705/335 |
| 2017/0124512 A1 | 5/2017 | Harvey | |
| 2017/0160735 A1* | 6/2017 | Mikan | G08G 1/20 |
| 2019/0034856 A1 | 1/2019 | High | |
| 2019/0206175 A1* | 7/2019 | High | G07F 11/004 |
| 2019/0220032 A1 | 7/2019 | Skorinko | |
| 2021/0209543 A1* | 7/2021 | Scott | B60R 11/04 |

OTHER PUBLICATIONS

Rodrigo R. Oliveira, Ismael M.G. Cardoso, Jorge L.V. Barbosa, Cristiano A. da Costa, Mario P. Prado, An intelligent model for logistics management based on geofencing algorithms and RFID technology, Expert Systems with Applications, vol. 42, Issues 15-16, 2015, pp. 6082-6097, ISSN 0957-4174 (Year: 2015).*

Ackerman, Evan, "This Year, Autonomous Trucks Will Take to the Road With No One on Board", IEEE Spectrum, Jan. 4, 2021, 2 pages, <https://spectrum.ieee.org/transportation/self-driving/this-year-autonomous-trucks-will-take-to-the-road-with-no-one-on-board>.

Chottani et al., "Distraction or disruption? Autonomous trucks gain ground in US logistics", McKinsey and Company, Dec. 10, 2018, 18 pages, <https://www.mckinsey.com/industries/travel-logistics-and-infrastructure/our-insights/distraction-or-disruption-autonomous-trucks-gain-ground-in-us-logistics>.

Curtis, Sophie, "Ford reveals 'Autolivery' concept for delivering packages using drones and self-driving vans at MWC 2017", Feb. 27, 2017, 12 pages, <https://www.mirror.co.uk/tech/ford-autolivery-concept-envisions-using-9925046>.

* cited by examiner

DELIVERY SYSTEM UTILIZING A SECONDARY TRANSPORTATION SERVICE PROVIDER

BACKGROUND OF THE INVENTION

The present invention relates generally to supply chain operations, and more particularly to product delivery logistics.

Logistics automation is the application of computer software and automated machinery to improve efficiency of logistics operations. Logistics automation may refer to realtime planning, control, and coordination of multiple autonomous vehicles used for delivering products to consumers.

Autonomous vehicles, such as autonomous transportation trucks, may provide the capability to transport products from a first location to a second location. Autonomous transportation trucks may provide the capability to be utilized as mobile warehouses, distributing products from a first location to several additional locations. Consumers may be able to purchase products in transit directly from the autonomous transportation trucks, and the purchased products may be distributed from the autonomous transportation trucks directly to the consumers.

SUMMARY

Aspects of an embodiment of the present invention disclose a method, computer program product, and computer system for dynamically booking, from an autonomous transportation vehicle, a secondary transportation vehicle. The method includes identifying, by one or more computer processors, a route for the autonomous transportation vehicle transporting one or more products from a first location to a second location. The method includes publishing, by the one or more computer processors, the one or more products online as available for purchase. The method includes identifying, by the one or more computer processors, a customer order for the one or more products. The method includes requesting, by the one or more computer processors, a secondary transportation vehicle to deliver the one or more products to fulfill the customer order. The method includes instructing, by the one or more computer processors, the secondary transportation vehicle to retrieve the one or more products to fulfill the customer order from the autonomous transportation vehicle. The method includes instructing, by the one or more computer processors, the secondary transportation vehicle to deliver the one or more products from the autonomous transportation vehicle to a delivery location to fulfill the customer order.

DETAILED DESCRIPTION

Embodiments of the present invention recognize that where autonomous transportation trucks are transporting products from a first location to a second location, and consumers are purchasing the products in transit from the autonomous transportation trucks utilizing an online purchasing service, the autonomous transportation trucks may not be able to deliver or distribute purchased products to a delivery location for each of the consumers. For example, transportation restrictions, such as available road space, road hazards, vehicle weight restrictions, maximum vehicle height restrictions, and rural destinations far from a transportation route, may prohibit the autonomous transportation trucks from delivering or distributing purchased products to consumers. Embodiments of the present invention recognize that where autonomous transportation trucks are transporting products from a first location to a second location, and consumers are purchasing the products in transit from the autonomous transportation trucks utilizing an online purchasing service, delivery of the products to customers poses many environmental and logistical challenges that can become cost prohibitive.

Embodiments of the present invention provide the capability to, based on a received online purchase for various products in transit on an autonomous transportation truck, instruct the autonomous transportation truck to dynamically book, from an autonomous transportation vehicle, a secondary transportation vehicle for delivering products from the autonomous transportation vehicle to a customer, where the secondary transportation vehicle is further instructed to retrieve the various products from the autonomous transportation truck along a pre-determined transportation route, and deliver the various products to one or more customers at one or more delivery locations. Embodiments of the present invention provide the capability to utilize a communication matrix and simulated models to forecast scenarios and outcomes that will optimize delivery costs and drive efficiency in product delivery.

Implementation of such embodiments may take a variety of forms, and exemplary implementation details are discussed subsequently with reference to the Figures.

Figure 1:
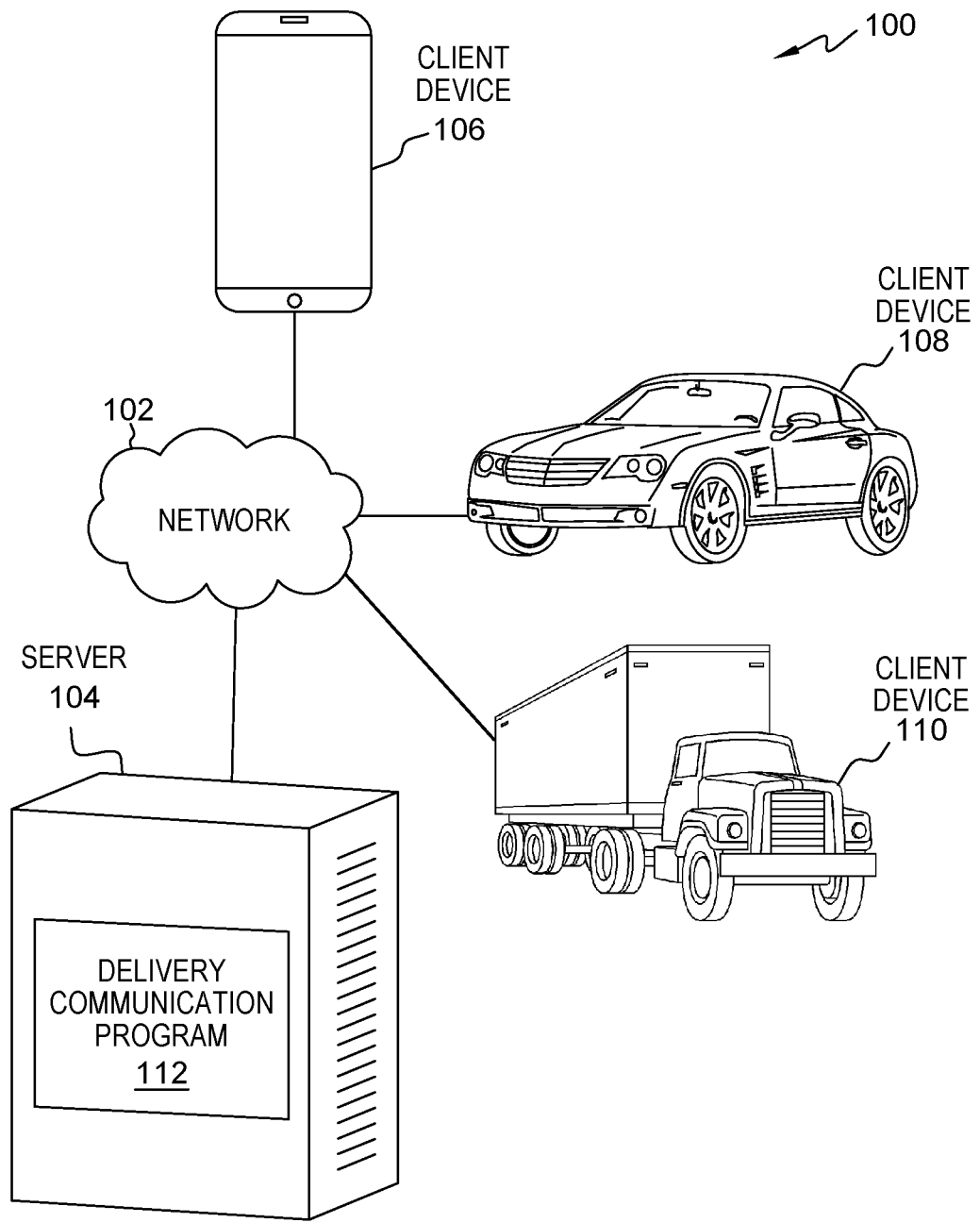
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing a delivery communication system utilizing a secondary transportation service provider, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and one or more client devices, such as client device 106, client device 108, and client device 110.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, and delivery communication program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information, and location data, including global positioning system (GPS) data, etc. In general, network 102 may be any combination of connections and protocols that will support communications between server 104, client device 106, client device 108, client device 110, and delivery communication program 112, as well as other computing devices and servers (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This configuration may be implemented for data centers in addition to cloud computing applications. In one embodiment, server 104 includes delivery communication program 112 for dynamically booking, from an autonomous transportation vehicle, a secondary transportation vehicle for delivering products from the autonomous transportation vehicle to a customer.

In one embodiment, delivery communication program 112 operates on a central server, such as server 104, and can be utilized by one or more client devices, such as client device 106, client device 108, and client device 110, via an application download from the central server or a third-party application store and executed on the one or more client devices. In another embodiment, delivery communication program 112 may be software, downloaded from a central server, such as server 104, and installed on one or more client devices, such as client device 106, client device 108, and client device 110. In yet another embodiment, delivery communication program 112 may be utilized as a software service provided by a third-party cloud service provider (not shown). In yet another embodiment, delivery communication program 112 may include one or more components (not shown), such as add-ons, plug-ins, and agent programs, etc., installed on one or more client devices, such as client device 106, client device 108, and client device 110, for dynamically booking, from an autonomous transportation vehicle, a secondary transportation vehicle for delivering products from the autonomous transportation vehicle to a customer. In one embodiment, delivery communication program 112 can be an add-on feature to a logistics service that provides the capability to dynamically book, from an autonomous transportation vehicle, a secondary transportation vehicle for delivering products from the autonomous transportation vehicle to a customer. In one embodiment, delivery communication program 112 can be fully integrated with one or more autonomous transportation vehicles deployed by a logistics service. In some embodiments, delivery communication program 112 may be partially integrated or separate from a logistics service. In one embodiment, delivery communication program 112 can be an add-on feature for a conventional navigation system (not shown), where the add-on feature enables an autonomous transportation vehicle to dynamically book a secondary transportation vehicle for delivering products from the autonomous transportation vehicle to a customer. In one embodiment, delivery communication program 112 can be fully integrated with a navigation system integrated with an autonomous transportation vehicle. In some embodiments, delivery communication program 112 may be partially integrated or separate from a conventional navigation system integrated with an autonomous transportation vehicle. In one embodiment, delivery communication program 112 may be an application, downloaded from an application store or third-party provider, capable of being used in conjunction with logistics management tools integrated with one or more client devices, such as client device 106, client device 108, and client device 110, to dynamically book, from an autonomous transportation vehicle, a secondary transportation vehicle for delivering products from the autonomous transportation vehicle to a customer.

In one embodiment, delivery communication program 112 can be utilized by a client device, such as client device 106, client device 108, and client device 110, to dynamically book, from an autonomous transportation vehicle, such as client device 110, a secondary transportation vehicle, such as client device 106, for delivering products from the autonomous transportation vehicle to a customer. In one embodiment, delivery communication program 112 provides the capability to, based on received online orders from one or more customers for one or more products being transported from a first location to a second location on an autonomous transportation vehicle, instruct the autonomous transportation vehicle to request a secondary transportation vehicle from a second transportation service provider to deliver the one or more products from the autonomous transportation vehicle to the one or more customers at a delivery location. In one embodiment, delivery communication program 112 provides the capability to identify a pre-determined route for the autonomous transportation vehicle, one or more orders placed by one or more customers for products being transported by the autonomous transportation vehicle, a delivery location for each of the one or more customers, and one or more secondary transportation vehicles deployed by a secondary transportation service provider to be utilized for retrieving products purchased by the one or more customers from the autonomous transportation vehicle and delivering the products to each of the one or more customers at the various delivery locations. In one embodiment, delivery communication program 112 provides the capability to virtually publish (i.e., advertise as available online for purchase) a variety of products being transported by an autonomous transportation vehicle from a first location to a second location. In one embodiment, delivery communication program 112 provides the capability to broadcast the variety of products along a pre-determined geographic boundary surrounding the autonomous transportation vehicle, such that one or more customers within the pre-determined geographic boundary can view and purchase the variety of products online. In one embodiment, delivery communication program 112 provides the capability to communicate and exchange location information between the autonomous transportation vehicle and one or more secondary transportation vehicles, such that the autonomous transportation vehicle and the one or more secondary transportation vehicles can collaborate to facilitate a transfer of products purchased by one or more customers from the autonomous transportation vehicle to one or more secondary transportation vehicles for delivery to the one or more customers. In one embodiment, delivery communication program 112 provides the capability to, based on a selection of a secondary transportation vehicle, identify a delivery location for a customer, and identify a route to travel from an autonomous transportation vehicle or an on-road inventory checkpoint to the delivery location. In one embodiment, delivery communication program 112 provides the capability to determine one or more on-road inventory checkpoints to accept products from an autonomous transportation vehicle and provide a fixed location for a secondary transportation vehicle to retrieve the products without having to rendezvous with the autonomous transportation vehicle. In one embodiment, delivery communication program 112 provides the capability to identify a direction of travel for an autonomous transportation vehicle and a direction of travel for a secondary transportation vehicle, such that when the autonomous transportation vehicle and the secondary transportation vehicle will intersect traveling in opposite directions, delivery communication program 112 can deploy one or more drones to transfer products from the autonomous transportation vehicle to the secondary transportation vehicle to reduce travel costs and save time.

In one embodiment, delivery communication program 112 may be configured to access various data sources, such as a database or repository (not shown), that may include personal data, content, contextual data, or information a user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Delivery communication program 112 enables the authorized and secure processing of personal data. In various embodiments, delivery communication program 112 obtains informed consent from the user, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In another embodiment, delivery communication program 112 provides information regarding personal data and the nature (e.g., type, scope, purpose, duration, etc.) of the processing. In various embodiments, delivery communication program 112 provides a user with copies of stored personal data. In various embodiments, delivery communication program 112 allows the correction or completion of incorrect or incomplete personal data. In various embodiments, delivery communication program 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, utilize one or more communication tools, and utilize one or more software applications. In another example, client device 108 and client device 110 may be a computing device utilized by an IT incident management service, respectively. In one embodiment, client device 106, client device 108, and client device 110 may be any suitable type of client device capable of executing one or more applications utilizing a mobile operating system or a computer operating system. In one embodiment, client device 106, client device 108, and client device 110 may include a user interface (not shown) for providing a user (e.g., a SRE, client, or IT incident manager, etc.) with the capability to interact with delivery communication program 112, one or more SREs utilizing a computing device, such as client device 108, and one or more communications originating from a computing device, such as client device 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106 may be any wearable computer capable of operating a computer program, such as delivery communication program 112, to dynamically book, from an autonomous transportation vehicle, a secondary transportation vehicle for delivering products from the autonomous transportation vehicle to a customer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102. In one embodiment, client device 106, client device 108, and client device 110 may be integrated into a vehicle. For example, client device 106, client device 108, and client device 110 may include a heads-up display (HUDS) integrated into a dashboard of an autonomous transportation vehicle, such as client device 110, or a secondary transportation vehicle, such as client device 106, to project an image on a windshield of the vehicle. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102.

In one embodiment, client device 108 represents a secondary transportation vehicle, such as a motor vehicle (e.g., a car, a bus, a box truck, a van, a motorcycle, a scooter, etc.), deployed through a secondary transportation service provider upon receiving a request from an autonomous transportation vehicle. In one embodiment, client device 108 may be a secondary transportation vehicle deployed by a secondary transportation service provider for transporting people from a first location to a second location. In one embodiment, client device 108 may be any type of secondary transportation vehicle capable of being deployed by a secondary transportation service provider for transporting products from an autonomous transportation vehicle to a delivery location. In one embodiment, client device 110 represents an autonomous transportation vehicle, such as an autonomous truck, deployed by a logistics service provider for transporting products from a first location to a second location. In one embodiment, client device 110 represents an autonomous transportation vehicle having any level of autonomous integration (e.g., Level 3, Level 4, Level 5), such as constrained platooning of trucks, constrained autonomy, and full driverless autonomy.

Figure 2:
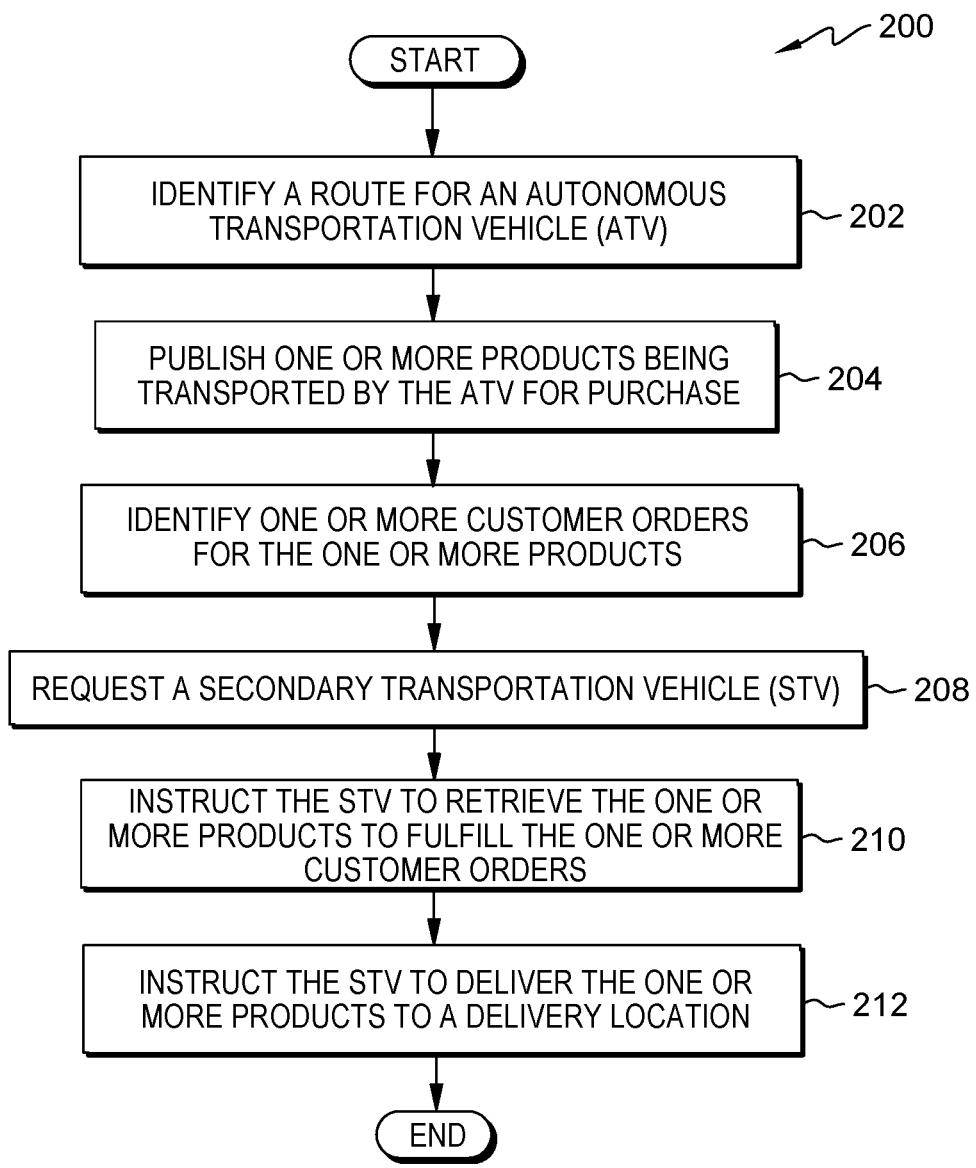
FIG. 2 is a flowchart depicting operational steps of a delivery communication program, such as the delivery communication program of FIG. 1, generally designated 200, for dynamically booking, from an autonomous transportation vehicle, a secondary transportation vehicle for delivering products from the autonomous transportation vehicle to a customer, in accordance with an embodiment of the present invention.

FIG. 2 is a flowchart depicting operational steps of a metrics program, such as metrics program 112, generally designated 200, for dynamically booking, from an autonomous transportation vehicle, a secondary transportation vehicle for delivering products from the autonomous transportation vehicle to a customer, in accordance with an embodiment of the present invention.

Delivery communication program 112 identifies a route for an autonomous transportation vehicle (202). In one embodiment, delivery communication program 112 identifies a route for an autonomous transportation vehicle by determining an autonomous transportation vehicle, such as client device 110, deployed by a logistics service provider. In one embodiment, delivery communication program 112 communicates with the logistics service provider to determine the autonomous transportation vehicle from, for example, a fleet log. In one embodiment, delivery communication program 112 determines a first location, such as a location (e.g., a manufacturing facility), where the autonomous transportation vehicle is loaded with one or more products to be transported, and a second location, such as a location (e.g., a warehouse), where the autonomous transportation vehicle is traveling to deliver the one or more products. In one embodiment, delivery communication program 112 determines a route that has been determined for the autonomous transportation vehicle utilizing data, such as global positioning system (GPS) coordinates, route navigation data, and logistics data, etc.

Delivery communication program 112 publishes one or more products being transported by the autonomous transportation vehicle (204). In one embodiment, delivery communication program 112 publishes one or more products being transported by the autonomous transportation vehicle by determining an inventory of a plurality of available products loaded onto the autonomous transportation truck utilizing, for example, scannable codes (e.g., QR codes), labels (e.g., barcodes), a loading log, and inventory list. In one embodiment, delivery communication program 112 publishes one or more of the plurality of available products online utilizing, for example, a mobile application or website, where publishing the one or more products includes advertising the one or more products as available for sale. In one embodiment, delivery communication program 112 publishes the one or more products by creating a moving geofence boundary that is affixed to the autonomous transportation vehicle along the route (i.e., follows the autonomous transportation vehicle), and publishing the one or more products such that they are viewable online by customers located within the moving geofence boundary (i.e., within a pre-determined proximity to the autonomous transportation vehicle). In one embodiment, delivery communication program 112 shares a current location of the autonomous transportation vehicle within the moving geofence boundary such that customers can determine a customer location relative to the current location of the autonomous transportation vehicle. In one embodiment, delivery communication program 112 publishes one or more available products from the plurality of products as a list or lot of available products. In one embodiment, delivery communication program 112 updates a list or lot of available products based on one or more customer orders for the one or more products, such that as products are purchased online from the autonomous transportation vehicle, delivery communication program 112 updates the list to prevent any unavailable products from being published for purchase. In one embodiment, delivery communication program 112 removes one or more products from being viewable online where they are added to a customer order.

Delivery communication program 112 identifies one or more customer orders for the one or more products (206). In one embodiment, delivery communication program 112 identifies one or more customer orders for the one or more products by receiving one or more customer orders for the one or more products published as available for purchase. In one embodiment, delivery communication program 112 a customer order is generated when a customer completes an online purchase for one or more products available on the autonomous transportation vehicle. In one embodiment, delivery communication program 112 communicates the one or more customer orders with the autonomous transportation vehicle. In one embodiment, based on the one or more customer orders, delivery communication program 112 determines a customer location and a delivery location for the one or more products needed to fulfill the one or more customer orders by extracting information from the customer order. In one embodiment, delivery communication program 112 aggregates a plurality of customer orders received within the moving geofenced boundary, such that the one or more products needed to fulfill the one or more customer orders within the moving geofenced boundary can be flagged for disbursement and delivery. In one embodiment, delivery communication program 112 may determine a threshold number of customer orders and a threshold number of products to be purchased before a disbursement of products from the autonomous transportation vehicle (e.g., a drop off at an inventory checkpoint, a roadside stop to unload products, etc.) is scheduled.

Delivery communication program 112 requests a secondary transportation vehicle (208). In one embodiment, responsive to receiving one or more customer orders for the one or more products, delivery communication program 112 requests a secondary transportation vehicle. In one embodiment, delivery communication program 112 may request a secondary transportation vehicle, such as client device 106, by determining a threshold number of customer orders and a threshold number for products have been purchased from the autonomous transportation vehicle. In one embodiment, delivery communication program 112 requests a secondary transportation vehicle from a secondary transportation service provider to complete a final delivery of the one or more products to one or more customers within the moving geofence boundary. In one embodiment, delivery communication program 112 analyzes the one or more customer orders to determine a customer location, a delivery location, a current location of the autonomous transportation vehicle, an estimated time of arrival for a secondary transportation vehicle to reach the autonomous transportation truck from an originating location, and a route from the current location of the autonomous transportation truck to the delivery location for the one or more products. In one embodiment, delivery communication program 112 determines a type of secondary transportation vehicle (e.g., truck, car, motorcycle, scooter, bicycle, etc.) to request based, at least in part, on a volume of the one or more products sold within the moving geofence boundary, a size of the one or more products purchased, and a distance from the autonomous transportation vehicle to the delivery location, such that the secondary transportation vehicle can efficiently deliver the one or more products to respective delivery locations within the moving geofenced boundary. In one embodiment, the secondary transportation vehicle may be an autonomous vehicle, such as an autonomous car or a drone, or a conventional vehicle requiring a human operator.

In one embodiment, delivery communication program 112 utilizes a communication matrix established between the logistics service provider, the autonomous transportation vehicle, secondary transportation service provider, and the secondary transportation vehicle to identify various parameters for inclusion into a digital twin simulation model to be utilized for driving informed decisions when booking a secondary transportation vehicle. In one embodiment, delivery communication program 112 generates a simulated model that considers as inputs various parameters, including, but not limited to, one or more products are being transported by the autonomous transportation vehicle, a plurality of road conditions, a plurality of weather conditions, a travel distance (e.g., a route distance, a delivery distance from the autonomous transportation vehicle to a customer, a distance from a secondary transportation vehicle to a current location of the autonomous transportation vehicle, etc.), a plurality of roadway characteristics (e.g., a roadway dimension, a roadway vehicle weight limit, etc.), a plurality of traffic conditions (e.g., a construction zone, an accident, a travel delay due to congestion, etc.), and a number of customers that can be delivered to by a secondary transportation vehicle using a single booking, to identifying one or more scenarios where booking secondary transportation vehicle to deliver products from the autonomous transportation vehicle to a customer optimizes a delivery process. In one embodiment, delivery communication program 112 simultaneously performs a cost benefit analysis of a cost to book a secondary transportation vehicle while transporting one or more products from a first location to a second location to determine when booking a secondary transportation vehicle for delivering one or more available products from the autonomous transportation vehicle to customer optimizes a delivery process. In one embodiment, delivery communication program 112 identifies one or more scenarios where booking a secondary transportation vehicle for delivering one or more available products from the autonomous transportation vehicle to a customer optimizes the delivery process. In one embodiment, delivery communication program 112 performs a simulation that examines a total delivery cost by considering one or more scenarios and various parameters gathered from the communication matrix to identify when to book a secondary transportation vehicle, a type of secondary transportation vehicle to book, and how many secondary transportation vehicles to book. In one embodiment, delivery communication program 112, utilizing digital twin simulation techniques, determines one or more scenarios that improve the efficiency and cost of delivery one or more available products from the autonomous transportation vehicle to a customer.

In various embodiments, delivery communication program 112 performs digital twin simulation to determine an appropriate decision for booking the secondary transportation vehicle. For example, where delivery communication program 112 considers one or more parameters, such as a suspension system of a secondary transportation vehicle, delivery communication program 112 may determine that a fragile product should not be delivered with secondary transportation vehicles having a stiff suspension system. In yet another example, where delivery communication program 112 considers one or more parameters, such as overall condition of secondary transportation vehicle, delivery communication program 112 may determine that for products requiring a long delivery route to a customer, booking a secondary transportation vehicle that is older than ten years may not be cost effective and should be avoided when booking the secondary transportation vehicle. In various embodiments, delivery communication program 112 performs digital twin simulation to identify an appropriate timing, a location, a type of secondary transportation vehicle, a product safety condition, a timely delivery, etc., to ensure that a cost of booking the secondary transportation vehicle is optimized while delivering one or more available products to a customer location. In one embodiment, delivery communication program 112 inputs the various parameters into a digital twin simulation component to train a simulation model to determine an accurate representation of secondary transportation vehicle performance, product delivery performance, and customer satisfaction in a specific simulated environment under specific simulated conditions, and outputs a recommendation for booking a secondary transportation vehicle that optimizes delivery costs. In various embodiments, delivery communication program 112 outputs from the digital twin simulation component a performance score that indicates a level of performance of the secondary transportation vehicle under certain conditions and a cost optimization score indicating an amount of cost savings when booking a secondary transportation vehicle to deliver one or more available products from the autonomous transportation vehicle to a customer.

Delivery communication program 112 instructs the secondary transportation vehicle to retrieve the one or more products to fulfill the one or more customer orders (210). In one embodiment, delivery communication program 112 instructs the secondary transportation vehicle to retrieve the one or more products to fulfill the one or more customer orders by sending a current location of the autonomous transportation vehicle to the secondary transportation vehicle and a determined route from a location of the secondary transportation vehicle to the current location of the autonomous transportation vehicle. In one embodiment, delivery communication program 112 instructs the secondary transportation vehicle to rendezvous with the autonomous transportation vehicle to retrieve the one or more products to fulfill the one or more customer orders. In one embodiment, delivery communication program 112 may instruct the autonomous transportation vehicle to unload the one or more products utilizing an integrated robotic system for disbursement to the secondary transportation vehicle. In one embodiment, delivery communication program 112 may instruct an operator of the secondary transportation vehicle to remove the one or more products needed to fulfill the one or more customer orders. In one embodiment, delivery communication program 112 may instruct the autonomous transportation vehicle to unload the one or more products at a pre-determined inventory checkpoint (e.g., a centralized location within the moving geofence boundary, a designated roadside drop-off location, etc.), and further instruct the secondary transportation vehicle to retrieve the one or more products to fulfil the one or more customer orders from the pre-determined inventory checkpoint, which prevents the secondary transportation vehicle from chasing the autonomous transportation vehicle that are always on the move.

Delivery communication program 112 instructs the secondary transportation vehicle to deliver the one or more products to a delivery location (212). In one embodiment, delivery communication program 112 instructs the secondary transportation vehicle to deliver the one or more products to a delivery location by sending a delivery location for each of the one or more products to the secondary transportation vehicle and a preferred route from the autonomous transportation vehicle to the delivery location. In one embodiment, delivery communication program 112 generates a pre-determined route to the secondary transportation vehicle that optimizes delivery time from the autonomous transportation vehicle to the delivery location and communicates the pre-determined route to the secondary transportation vehicle. In one embodiment, delivery communication program 112 may determine an ordered list designating a delivery sequence in which the one or more products are to be delivered to one or more customers based on a pre-determined proximity to the autonomous transportation truck or proximity to the pre-determined inventory checkpoint. In one embodiment, delivery communication program 112 may share delivery information for the one or more products between a plurality of secondary transportation vehicles, and enable communication means between the plurality of secondary transportation vehicles to allow for exchange of products for faster delivery. In one embodiment, delivery communication program 112 may instruct secondary transportation vehicles to return undelivered products to the pre-determined inventory checkpoint, such that the returned products may be re-published for purchase.

Figure 3:
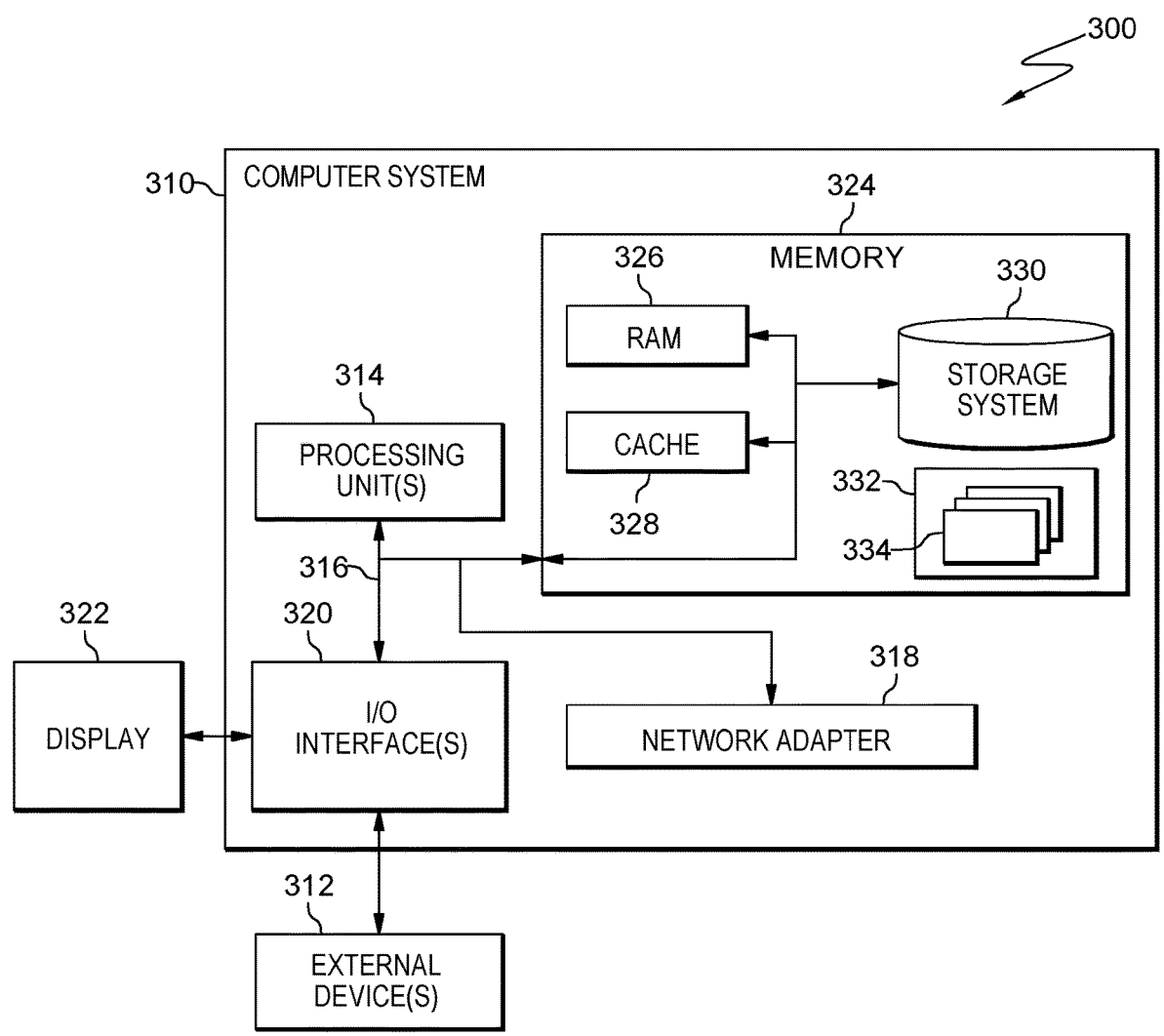
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for dynamically booking, from an autonomous transportation vehicle, a secondary transportation vehicle, the method comprising:
   identifying, by one or more computer processors, a route for the autonomous transportation vehicle transporting one or more products from a first location to a second location;
   publishing, by the one or more computer processors, the one or more products online as available for purchase;
   identifying, by the one or more computer processors, a customer order for the one or more products;
   creating, by the one or more computer processors, a moving geofence boundary that is affixed to the autonomous transportation vehicle along the route, wherein the one or more products are viewable online only by a customer located within the moving geofence boundary;
   requesting, by the one or more computer processors, the secondary transportation vehicle to deliver the one or more products to fulfill the customer order;
   instructing, by the one or more computer processors, the secondary transportation vehicle to retrieve the one or more products to fulfill the customer order from the autonomous transportation vehicle; and
   instructing, by the one or more computer processors, the secondary transportation vehicle to deliver the one or more products from the autonomous transportation vehicle to a delivery location to fulfill the customer order, wherein the secondary transportation vehicle delivers the one or more products to the delivery location within the moving geofenced boundary, and wherein publishing the one or more products online further includes the following;
      determining, by the one or more computer processors, an inventory of the one or more products loaded onto the autonomous transportation vehicle utilizing scannable codes; and
      advertising, by the one or more computer processors, the one or more products as available for sale utilizing a mobile application; and
      instructing, by the one or more computer processors, the autonomous transportation vehicle to unload the one or more products utilizing an integrated robotic system for disbursement to the secondary transportation vehicle.

2. The method of claim 1, wherein identifying a route for the autonomous transportation vehicle further comprises:
   determining, by the one or more computer processors, the autonomous transportation vehicle deployed by a logistics service provider, the first location where the autonomous transportation vehicle is loaded with the one or more products, and the second location where the autonomous transportation vehicle is traveling to deliver the one or more products.

3. The method of claim 1, wherein identifying a customer order further comprises:
   communicating, by the one or more computer processors, the customer order with the autonomous transportation vehicle; and
   extracting, by the one or more computer processors, information from the customer order to determine a customer location and the delivery location.

4. The method of claim 3, further comprising:
   aggregating, by the one or more computer processors, a plurality of customer orders received within a moving geofence boundary; and
   determining, by the one or more computer processors, a threshold number of customer orders and a threshold number of products to be purchased before a disbursement of products from the autonomous transportation vehicle is scheduled.

5. The method of claim 1, wherein requesting a secondary transportation vehicle further comprises:
   determining, by the one or more computer processors, a threshold number of customer orders and a threshold number for products have been purchased from the autonomous transportation vehicle; and
   determining, by the one or more computer processors, a type of secondary transportation vehicle to request based, at least in part, on a volume of the one or more products sold within a moving geofence boundary, a size of the one or more products purchased, and a distance from the autonomous transportation vehicle to the delivery location.

6. The method of claim 1, wherein instructing the secondary transportation vehicle to retrieve the one or more products to fulfill the customer order further comprises:
   sending, by the one or more computer processors, a current location of the autonomous transportation vehicle to the secondary transportation vehicle;
   sending, by the one or more computer processors, a determined route from a location of the secondary transportation vehicle to the current location of the autonomous transportation vehicle; and
   instructing, by the one or more computer processors, the secondary transportation vehicle to rendezvous with the autonomous transportation vehicle to retrieve the one or more products to fulfill the one or more customer orders.

7. The method of claim 1, wherein instructing the secondary transportation vehicle to deliver the one or more products from the autonomous transportation vehicle to a delivery location further comprises:
   generating, by the one or more computer processors, a pre-determined route to the secondary transportation vehicle that optimizes delivery time from the autonomous transportation vehicle to the delivery location;
   determining, by the one or more computer processors, an ordered list designating a delivery sequence that the one or more products are to be delivered to the delivery location based on a pre-determined proximity to the autonomous transportation vehicle; and
   communicating, by the one or more computer processors, the pre-determined route and the ordered list to the secondary transportation vehicle.

8. A computer program product for dynamically booking, from an autonomous transportation vehicle, a secondary transportation vehicle, the computer program product comprising:
   one or more computer readable storage media and program instructions stored on the one or more computer readable storage media, the stored program instructions comprising:
      program instructions to identify a route for the autonomous transportation vehicle transporting one or more products from a first location to a second location;
      program instructions to publish the one or more products online as available for purchase;
      program instructions to identify a customer order for the one or more products;

program instructions to create, by the one or more computer processors, a moving geofence boundary that is affixed to the autonomous transportation vehicle along the route, wherein the one or more products are viewable online only by a customer located within the moving geofence boundary;

program instructions to request the secondary transportation vehicle to deliver the one or more products to fulfill the customer order;

program instructions to instruct the secondary transportation vehicle to retrieve the one or more products to fulfill the customer order from the autonomous transportation vehicle; and program instructions to instruct the secondary transportation vehicle to deliver the one or more products from the autonomous transportation vehicle to a delivery location to fulfill the customer order, wherein the secondary transportation vehicle delivers the one or more products to the delivery location within the moving geofenced boundary, wherein the program instructions to publish the one or more products online further include the following;

program instructions to determine an inventory of the one or more products loaded onto the autonomous transportation vehicle utilizing scannable codes; and program instructions to advertise the one or more products as available for sale utilizing a mobile application; and program instructions to instruct the autonomous transportation vehicle to unload the one or more products utilizing an integrated robotic system for disbursement to the secondary transportation vehicle.

9. The computer program product of claim 8, wherein the program instructions to identify a route for the autonomous transportation vehicle further comprise:

program instructions to determine the autonomous transportation vehicle deployed by a logistics service provider, the first location where the autonomous transportation vehicle is loaded with the one or more products, and the second location where the autonomous transportation vehicle is traveling to deliver the one or more products.

10. The computer program product of claim 8, wherein the program instructions to identify a customer order further comprise:

program instructions to communicate the customer order with the autonomous transportation vehicle; and program instructions to extract information from the customer order to determine a customer location and the delivery location.

11. The computer program product of claim 10, the stored program instructions further comprising:

program instructions to aggregate a plurality of customer orders received within a moving geofence boundary; and program instructions to determine a threshold number of customer orders and a threshold number of products to be purchased before a disbursement of products from the autonomous transportation vehicle is scheduled.

12. The computer program product of claim 8, wherein the program instructions to request a secondary transportation vehicle further comprise:

program instructions to determine a threshold number of customer orders and a threshold number for products have been purchased from the autonomous transportation vehicle; and program instructions to determine a type of secondary transportation vehicle to request based, at least in part, on a volume of the one or more products sold within a moving geofence boundary, a size of the one or more products purchased, and a distance from the autonomous transportation vehicle to the delivery location.

13. The computer program product of claim 8, wherein the program instructions to instruct the secondary transportation vehicle to retrieve the one or more products to fulfill the customer order further comprise:

program instructions to send a current location of the autonomous transportation vehicle to the secondary transportation vehicle;

program instructions to send a determined route from a location of the secondary transportation vehicle to the current location of the autonomous transportation vehicle;

program instructions to instruct the secondary transportation vehicle to rendezvous with the autonomous transportation vehicle to retrieve the one or more products to fulfill the one or more customer orders; and program instructions to instruct the autonomous transportation vehicle to unload the one or more products utilizing an integrated robotic system for disbursement to the secondary transportation vehicle.

14. The computer program product of claim 8, wherein the program instructions to instruct the secondary transportation vehicle to deliver the one or more products from the autonomous transportation vehicle to a delivery location further comprise:

program instructions to generate a pre-determined route to the secondary transportation vehicle that optimizes delivery time from the autonomous transportation vehicle to the delivery location;

program instructions to determine an ordered list designating a delivery sequence that the one or more products are to be delivered to the delivery location based on a pre-determined proximity to the autonomous transportation vehicle; and program instructions to communicate the pre-determined route and the ordered list to the secondary transportation vehicle.

15. A computer system for dynamically booking, from an autonomous transportation vehicle, a secondary transportation vehicle, the computer system comprising:

one or more computer processors;

one or more computer readable storage media; and program instructions stored on at least one of the one or more computer readable storage media for execution by at least one of the one or more computer processors, the stored program instructions comprising:

program instructions to identify a route for the autonomous transportation vehicle transporting one or more products from a first location to a second location;

program instructions to publish the one or more products online as available for purchase;

program instructions to identify a customer order for the one or more products;

program instructions to create, by the one or more computer processors, a moving geofence boundary that is affixed to the autonomous transportation vehicle along the route, wherein the one or more products are viewable online only by a customer located within the moving geofence boundary;

program instructions to request a secondary transportation vehicle to deliver the one or more products to fulfill the customer order;

program instructions to instruct the secondary transportation vehicle to retrieve the one or more products to fulfill the customer order from the autonomous transportation vehicle; and program instructions to instruct the secondary transportation vehicle to deliver the one or more products from the autonomous transportation vehicle to a delivery location to fulfill the customer order, wherein the secondary transportation vehicle delivers the one or more products to the delivery location within the moving geofenced boundary, wherein the program instructions to identify a customer order further includes the following;

program instructions to communicate the customer order with the autonomous transportation vehicle; and program instructions to extract information from the customer order to determine a customer location and the delivery location; and program instructions to instruct the autonomous transportation vehicle to unload the one or more products utilizing an integrated robotic system for disbursement to the secondary transportation vehicle.

16. The computer system of claim 15, wherein the program instructions to identify a route for the autonomous transportation vehicle further comprise:

program instructions to determine the autonomous transportation vehicle deployed by a logistics service provider, the first location where the autonomous transportation vehicle is loaded with one or more products, and the second location where the autonomous transportation vehicle is traveling to deliver the one or more products.

17. The computer system of claim 15, wherein the program instructions to publish the one or more products online further comprise:

program instructions to determine an inventory of the one or more products loaded onto the autonomous transportation vehicle utilizing scannable codes;

program instructions to advertise the one or more products as available for sale utilizing a mobile application; and program instructions to create a moving geofence boundary that is affixed to the autonomous transportation vehicle along the route, wherein the one or more products are viewable online by the customer located within the moving geofence boundary.

18. A method for dynamically booking, from an autonomous transportation vehicle, a secondary transportation vehicle, the method comprising:

identifying, by one or more computer processors, a route for the autonomous transportation vehicle transporting one or more products from a first location to a second location;

publishing, by the one or more computer processors, the one or more products online as available for purchase;

identifying, by the one or more computer processors, a customer order for the one or more products;

creating, by the one or more computer processors, a moving geofence boundary that is affixed to the autonomous transportation vehicle along the route, wherein the one or more products are viewable online only by a customer located within the moving geofence boundary;

requesting, by the one or more computer processors, the secondary transportation vehicle to deliver the one or more products to fulfill the customer order;

instructing, by the one or more computer processors, the secondary transportation vehicle to retrieve the one or more products to fulfill the customer order from the autonomous transportation vehicle; and instructing, by the one or more computer processors, the secondary transportation vehicle to deliver the one or more products from the autonomous transportation vehicle to a delivery location to fulfill the customer order, wherein the secondary transportation vehicle delivers the one or more products to the delivery location within the moving geofenced boundary, wherein identifying a customer order further includes the following;

communicating, by the one or more computer processors, the customer order with the autonomous transportation vehicle;

extracting, by the one or more computer processors, information from the customer order to determine a customer location and the delivery location; and instructing, by the one or more computer processors, the autonomous transportation vehicle to unload the one or more products utilizing an integrated robotic system for disbursement to the secondary transportation vehicle.

19. The method of claim 18, further comprising:

aggregating, by the one or more computer processors, a plurality of customer orders received within a moving geofence boundary; and determining, by the one or more computer processors, a threshold number of customer orders and a threshold number of products to be purchased before a disbursement of products from the autonomous transportation vehicle is scheduled.

20. A method for dynamically booking, from an autonomous transportation vehicle, a secondary transportation vehicle, the method comprising:

identifying, by one or more computer processors, a route for the autonomous transportation vehicle transporting one or more products from a first location to a second location;

publishing, by the one or more computer processors, the one or more products online as available for purchase;

identifying, by the one or more computer processors, a customer order for the one or more products;

creating, by the one or more computer processors, a moving geofence boundary that is affixed to the autonomous transportation vehicle along the route, wherein the one or more products are viewable online only by a customer located within the moving geofence boundary;

requesting, by the one or more computer processors, the secondary transportation vehicle to deliver the one or more products to fulfill the customer order;

instructing, by the one or more computer processors, the secondary transportation vehicle to retrieve the one or more products to fulfill the customer order from the autonomous transportation vehicle; and instructing, by the one or more computer processors, the secondary transportation vehicle to deliver the one or more products from the autonomous transportation vehicle to a delivery location to fulfill the customer order, wherein the secondary transportation vehicle delivers the one or more products to the delivery location within the moving geofenced boundary, wherein requesting a secondary transportation vehicle further includes the following;

determining, by the one or more computer processors, a threshold number of customer orders and a threshold number for products have been purchased from the autonomous transportation vehicle;

determining, by the one or more computer processors, a type of secondary transportation vehicle to request based, at least in part, on a volume of the one or more products sold within a moving geofence boundary, a size of the one or more products purchased, and a distance from the autonomous transportation vehicle to the delivery location; and instructing, by the one or more computer processors, the autonomous transportation vehicle to unload the one or more products utilizing an integrated robotic system for disbursement to the secondary transportation vehicle.

21. A method for dynamically booking, from an autonomous transportation vehicle, a secondary transportation vehicle, the method comprising:

identifying, by one or more computer processors, a route for the autonomous transportation vehicle transporting one or more products from a first location to a second location;

publishing, by the one or more computer processors, the one or more products online as available for purchase;

identifying, by the one or more computer processors, a customer order for the one or more products;

creating, by the one or more computer processors, a moving geofence boundary that is affixed to the autonomous transportation vehicle along the route, wherein the one or more products are viewable online only by a customer located within the moving geofence boundary;

requesting, by the one or more computer processors, the secondary transportation vehicle to deliver the one or more products to fulfill the customer order;

instructing, by the one or more computer processors, the secondary transportation vehicle to retrieve the one or more products to fulfill the customer order from the autonomous transportation vehicle; and instructing, by the one or more computer processors, the secondary transportation vehicle to deliver the one or more products from the autonomous transportation vehicle to a delivery location to fulfill the customer order, wherein the secondary transportation vehicle delivers the one or more products to the delivery location within the moving geofenced boundary, wherein instructing the secondary transportation vehicle to retrieve the one or more products to fulfill the customer order further includes the following;

sending, by the one or more computer processors, a current location of the autonomous transportation vehicle to the secondary transportation vehicle;

sending, by the one or more computer processors, a determined route from a location of the secondary transportation vehicle to the current location of the autonomous transportation vehicle;

instructing, by the one or more computer processors, the secondary transportation vehicle to rendezvous with the autonomous transportation vehicle to retrieve the one or more products to fulfill the one or more customer orders; and instructing, by the one or more computer processors, the autonomous transportation vehicle to unload the one or more products utilizing an integrated robotic system for disbursement to the secondary transportation vehicle.

22. A method for dynamically booking, from an autonomous transportation vehicle, a secondary transportation vehicle, the method comprising:

identifying, by one or more computer processors, a route for the autonomous transportation vehicle transporting one or more products from a first location to a second location;

publishing, by the one or more computer processors, the one or more products online as available for purchase;

identifying, by the one or more computer processors, a customer order for the one or more products;

creating, by the one or more computer processors, a moving geofence boundary that is affixed to the autonomous transportation vehicle along the route, wherein the one or more products are viewable online only by a customer located within the moving geofence boundary;

requesting, by the one or more computer processors, the secondary transportation vehicle to deliver the one or more products to fulfill the customer order;

instructing, by the one or more computer processors, the secondary transportation vehicle to retrieve the one or more products to fulfill the customer order from the autonomous transportation vehicle; and instructing, by the one or more computer processors, the secondary transportation vehicle to deliver the one or more products from the autonomous transportation vehicle to a delivery location to fulfill the customer order, wherein the secondary transportation vehicle delivers the one or more products to the delivery location within the moving geofenced boundary, wherein instructing the secondary transportation vehicle to deliver the one or more products from the autonomous transportation vehicle to a delivery location further includes the following;

generating, by the one or more computer processors, a pre-determined route to the secondary transportation vehicle that optimizes delivery time from the autonomous transportation vehicle to the delivery location;

determining, by the one or more computer processors, an ordered list designating a delivery sequence that the one or more products are to be delivered to the delivery location based on a pre-determined proximity to the autonomous transportation vehicle;

communicating, by the one or more computer processors, the pre-determined route and the ordered list to the secondary transportation vehicle; and instructing, by the one or more computer processors, the autonomous transportation vehicle to unload the one or more products utilizing an integrated robotic system for disbursement to the secondary transportation vehicle.

* * * * *